(12) United States Patent
Mukae

(10) Patent No.: US 11,952,150 B2
(45) Date of Patent: Apr. 9, 2024

(54) DEBRIS RETRIEVAL CONTROL APPARATUS, DEBRIS RETRIEVAL SATELLITE, AND DEBRIS RETRIEVAL SYSTEM

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 141 days.

(21) Appl. No.: 17/609,781

(22) PCT Filed: Jun. 25, 2019

(86) PCT No.: PCT/JP2019/025227
§ 371 (c)(1),
(2) Date: Nov. 9, 2021

(87) PCT Pub. No.: WO2020/261397
PCT Pub. Date: Dec. 30, 2020

(65) Prior Publication Data
US 2022/0219841 A1    Jul. 14, 2022

(51) Int. Cl.
*B64G 1/10* (2006.01)
*B64G 1/24* (2006.01)
*B64G 1/64* (2006.01)

(52) U.S. Cl.
CPC ............. *B64G 1/1081* (2023.08); *B64G 1/24* (2013.01); *B64G 1/64* (2013.01)

(58) Field of Classification Search
CPC . B64G 1/64; B64G 1/24; B64G 1/222; B64G 2001/1092; B64G 2004/005;
(Continued)

(56) References Cited

U.S. PATENT DOCUMENTS 5,372,340 A * 12/1994 Ihara ............... B64G 1/1085
244/172.5
5,421,540 A *  6/1995 Ting ................ B64G 1/1078
244/158.1
(Continued)

FOREIGN PATENT DOCUMENTS

CN     109 250 158 A     1/2019
CN     109250158 A *     1/2019 ............... B64G 1/66
(Continued)

OTHER PUBLICATIONS

International Search Report and Written Opinion dated Sep. 3, 2019, received for PCT Application PCT/JP2019/025227, Filed on Jun. 25, 2019, 10 pages including English Translation.
(Continued)

*Primary Examiner* — Richard Green
*Assistant Examiner* — Nevena Aleksic
(74) *Attorney, Agent, or Firm* — XSENSUS LLP

(57) ABSTRACT

An apparatus communication device (950) communicates with at least one of a parent satellite (310) and a child satellite (320). A control unit (110) generates a control command (51) to capture debris by sandwiching the debris between the parent satellite (310) and the child satellite (320) and carry out an active control operation during orbital descent on a flying object which is the parent satellite (310), the debris, and the child satellite (320) being connected together. Then, the control unit (110) transmits the control command (51) to at least one of the parent satellite (310) and the child satellite (320) via the apparatus communication device (950).

7 Claims, 12 Drawing Sheets

(58) Field of Classification Search
CPC ...... B64G 1/1085; B64G 1/242; B64G 1/244; B64G 1/62; B64G 1/646; B64G 1/68; B64G 1/56; B64G 1/1078
See application file for complete search history.

(56) References Cited

U.S. PATENT DOCUMENTS

| | | | |
|---|---|---|---|
| 9,938,024 | B1 | 4/2018 | Fork |
| 2006/0278765 | A1 | 12/2006 | Strack et al. |
| 2011/0036952 | A1* | 2/2011 | Moorer, Jr. ............ B64G 1/646 244/158.6 |
| 2011/0121139 | A1 | 5/2011 | Poulos |
| 2012/0286100 | A1 | 11/2012 | Knirsch |
| 2015/0151856 | A1 | 6/2015 | Reed |
| 2018/0093786 | A1 | 4/2018 | Schwarz et al. |
| 2018/0148197 | A1* | 5/2018 | Halsband ............... B64G 1/242 |
| 2018/0370658 | A1 | 12/2018 | Amimoto et al. |
| 2019/0359357 | A1 | 11/2019 | Shimamura et al. |

FOREIGN PATENT DOCUMENTS

| | | | |
|---|---|---|---|
| EP | 2860115 A1 * | 4/2015 | ........... B64G 1/1078 |
| EP | 2860115 A1 | 4/2015 | |
| JP | 2012-236591 A | 12/2012 | |
| JP | 2015-518796 A | 7/2015 | |
| JP | 2017-114159 A | 6/2017 | |
| WO | 2018/135118 A1 | 7/2018 | |

OTHER PUBLICATIONS

Extended European Search Report dated Nov. 9, 2022 in corresponding European Patent Application No. 19934492.0, 14 pages.
Partial European Search Report dated Aug. 31, 2022 in corresponding European Patent Application No. 19934492.0, 16 pages.
Office Action dated Nov. 16, 2023, in corresponding European patent Application No. 19934492.0, 5 pages.

* cited by examiner

DEBRIS RETRIEVAL CONTROL APPARATUS, DEBRIS RETRIEVAL SATELLITE, AND DEBRIS RETRIEVAL SYSTEM

CROSS-REFERENCE TO RELATED APPLICATION

The present application is based on PCT filing PCT/JP2019/025227, filed Jun. 25, 2019, the entire contents of which are incorporated herein by reference.

TECHNICAL FIELD

The present invention relates to a debris retrieval control apparatus, a debris retrieval satellite, a capture interface instrument, a connection device, a debris retrieval system, a debris retrieval method, and a debris retrieval program.

BACKGROUND ART

In recent years, space debris such as an artificial satellite that has become uncontrollable due to a failure or rocket debris has been increasing, and retrieval of space debris has become a problem.

In addition to the increase in space debris, large-scale satellite constellations including hundreds to thousands of satellites have started to be constructed, and the risk of collision accidents in orbit is increasing. Thus, in order to avoid collisions, there has been an appeal for the need for deorbit after completion of a mission in orbit (PMD), or ADR that causes debris such as a failed satellite or an upper stage of a rocket that is floating to deorbit by external means such as a debris retrieval satellite. International discussions have begun as STM on the need for such ADR. PMD is an abbreviation for Post Mission Disposal. ADR is an abbreviation for Active Debris Removal. STM is an abbreviation for Space Traffic Management.

Patent Literature 1 discloses a technology to capture space debris that is tumbling or rotating.

CITATION LIST

Patent Literature

Patent Literature 1: JP 2012-236591 A

SUMMARY OF INVENTION

Technical Problem

In the technology of Patent Literature 1, debris is captured with a rope-shaped object, so that a problem is that it is difficult to determine a center-of-gravity position when debris such as rocket debris or a failed satellite is to be retrieved.

In particular, in order to carry out an active control operation during orbital descent by a debris retrieval satellite connected with debris, it is necessary to place propulsion devices in a plurality of directions so as to sandwich the center-of-gravity position of the debris retrieval satellite connected with the debris. Therefore, for debris such as rocket debris or a failed satellite, it is difficult to place the propulsion devices at appropriate positions. For example, an instrument such as a robot arm that is long enough to wrap around the debris and has a great deal of freedom is required.

An object of the present invention is mainly to provide a debris retrieval control apparatus that can retrieve debris unerringly.

Solution to Problem

A debris retrieval control apparatus according to the present invention includes
- an apparatus communication device to communicate with at least one of a first satellite and a second satellite; and
- a control unit to generate a control command to capture debris by sandwiching the debris between the first satellite and the second satellite and carry out an active control operation during orbital descent on a flying object which is the first satellite, the debris, and the second satellite being connected together, and transmit the control command to at least one of the first satellite and the second satellite via the apparatus communication device.

Advantageous Effects of Invention

In a debris retrieval control apparatus according to the present invention, a control unit generates a control command to capture debris by sandwiching the debris between a first satellite and a second satellite and carry out an active control operation during orbital descent on a flying object which is the first satellite, the debris, and the second satellite being connected together. Then, the control unit transmits the control command to at least one of the first satellite and the second satellite via an apparatus communication device. Therefore, with the debris retrieval control apparatus according to this embodiment, there is an effect that debris can be retrieved unerringly.

DESCRIPTION OF EMBODIMENTS

Figure 1:
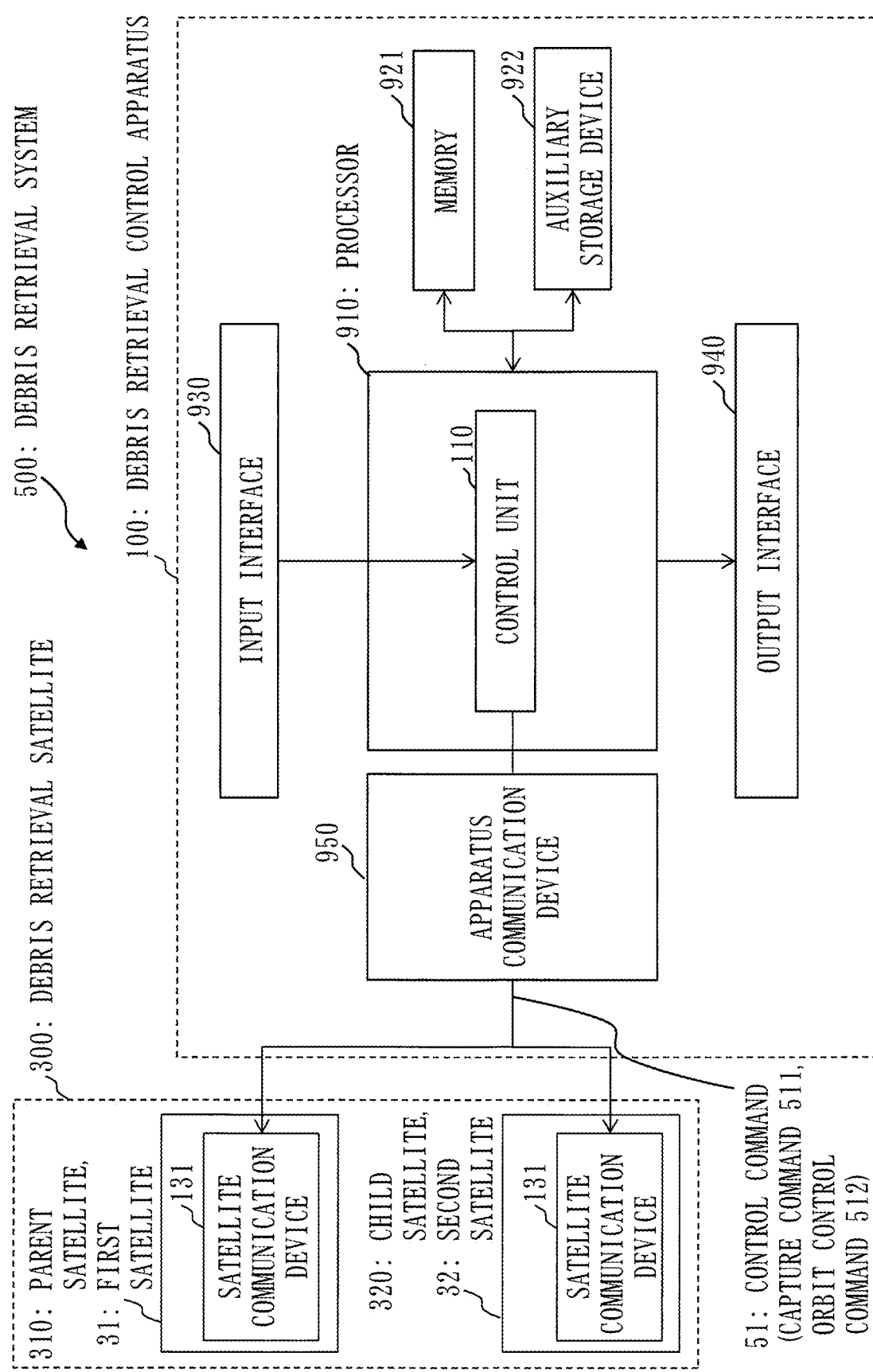
FIG. 1 is a configuration diagram of a debris retrieval system according to Embodiment 1.

Embodiments of the present invention will be described hereinafter with reference to the drawings. Throughout the drawings, the same or corresponding parts are denoted by the same reference signs. In the description of the embodiments, description of the same or corresponding parts will be suitably omitted or simplified. In the drawings hereinafter, the relative sizes of components may be different from actual ones. In the description of the embodiments, directions or positions such as "up", "down", "left", "right", "front", "rear", "top side", and "back side" may be indicated. These terms are used only for convenience of description, and are not intended to limit the placement and orientation of components such as devices, equipment, or parts.

The background to the following embodiments will now be described.

If a mega-constellation satellite or a debris retrieval satellite passes a congested low orbit or the polar region in the process of deorbiting, the risk of a collision becomes disproportionately high. The congested low orbit is, for example, in the vicinity of local standard time (LST) 10:30 or at altitudes of about 500 km to 800 km. For such deorbit in which the risk of a collision is disproportionately high, the rules for deorbit actions such as PMD or ADR currently being discussed are insufficient. In the deorbit process before entry into the atmosphere, it is necessary to carry out an active control operation during orbital descent which causes a descent by avoiding areas with disproportionately high risks. Such an active control operation during orbital descent will be referred to as an active deorbit operation. It is possible to avoid a collision by operation control in the deorbit process so as to control the orbital plane, altitude, timing for changing the orbital plane or altitude, and so on.

If only a deorbit action is simply to be performed, the purpose will be achieved by, for example, capturing debris by a debris retrieval satellite using net-like or rope-like capture means and applying deceleration force in a direction opposite to a flying direction.

However, in order to carry out active operation control in the deorbit process, orbit control and attitude control need to be performed on the mass characteristics of two bodies coupled together which are the debris retrieval satellite and the captured debris. Therefore, capture means that is not capable of restraining six degrees of freedom, such as net-like or rope-like capture means, is insufficient.

Even with capture means that is capable of restraining six degrees of freedom, desired orbit control and attitude control cannot be performed unless an injection vector of a propulsion device can be directed appropriately for the mass characteristics of the two bodies coupled together.

When carrying out such an active deorbit operation for debris, the debris retrieval satellite performs orbit control and attitude control with the mass characteristics in the state of being connected with the debris. For such orbit control and attitude control, the propulsion device needs to apply an injection that is vectored to pass through a center-of-gravity position.

In the following embodiments, aspects according to which debris retrieval satellites realize accurate orbit control and attitude control with the mass characteristics in the state of being connected with debris will be described.

Embodiment 1

Description of Configurations

FIG. 1 a diagram illustrating a configuration of a debris retrieval system 500 according to this embodiment.

Figure 2:
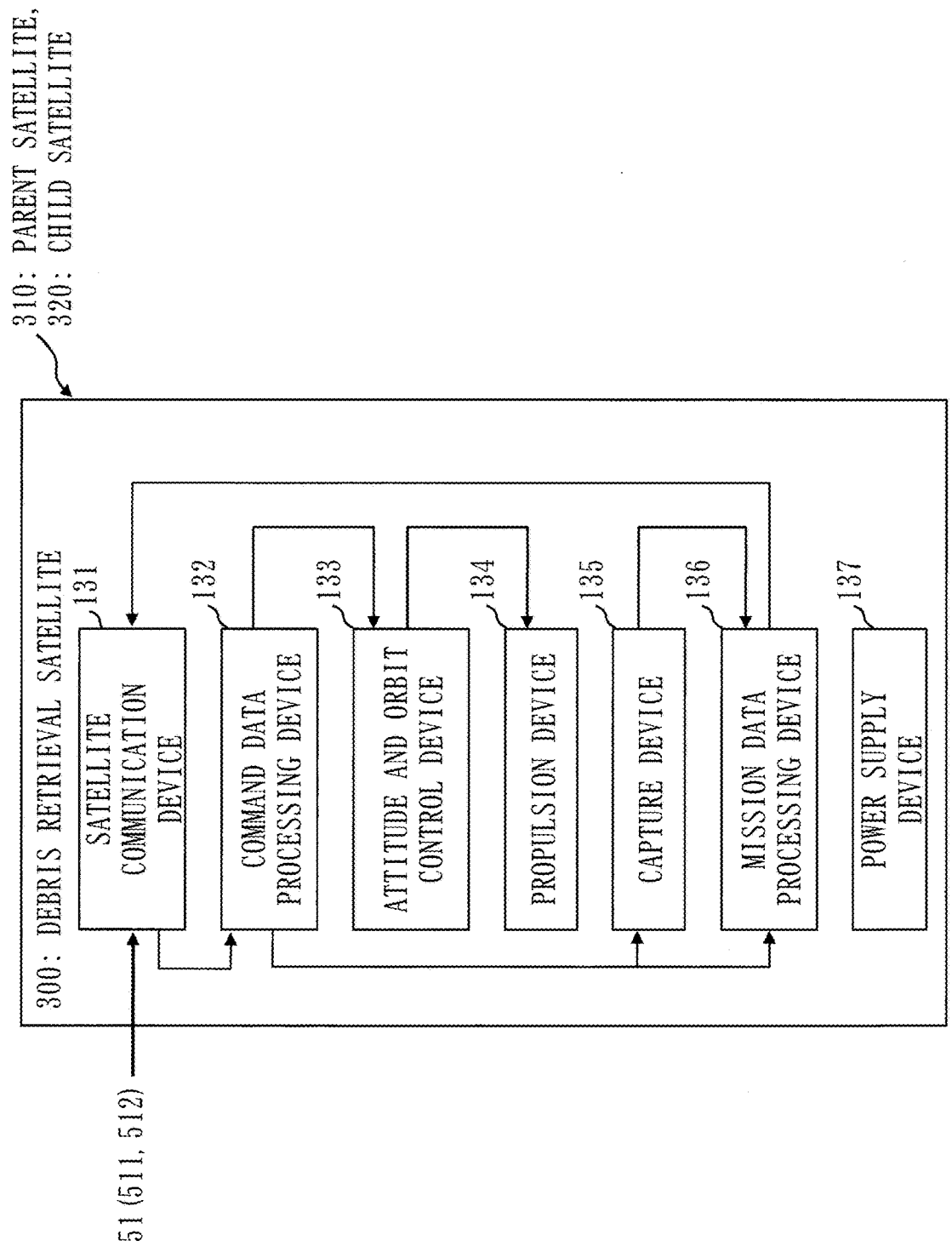
FIG. 2 is a configuration diagram of a debris retrieval satellite according to Embodiment 1.

FIG. 2 is a diagram illustrating a configuration of a debris retrieval satellite 300 according to this embodiment.

The debris retrieval system 500 includes a debris retrieval control apparatus 100 and the debris retrieval satellite 300. The debris retrieval system 500 captures debris 200 by sandwiching it between a parent satellite 310 and a child satellite 320, and carries out an active control operation during orbital descent, that is, an active deorbit operation on a flying object which is the parent satellite 310, the debris 200, and the child satellite 320 being connected together.

Specifically, the debris 200 is an object such as an artificial satellite that has become uncontrollable due to a failure or rocket debris. That is, the debris 200 is a relatively large object. For example, the debris 200 floats at altitudes of 100 km to 2000 km in an elliptical orbit.

The debris retrieval satellite 300 includes the parent satellite 310 and the child satellite 320. The parent satellite 310 is an example of a first satellite 31. The child satellite 320 is an example of a second satellite 32. The debris retrieval control apparatus 100 communicates with each of the parent satellite 310 and the child satellite 320. The debris retrieval control apparatus 100 communicates with the debris retrieval satellite 300 via an apparatus communication device 950 of the debris retrieval control apparatus 100 and a satellite communication device 131 of each of the parent satellite 310 and the child satellite 320.

In the following description, both or each of the parent satellite 310 and the child satellite 320 may be referred to as the debris retrieval satellite 300.

The debris retrieval control apparatus 100 is a facility located on the ground. The debris retrieval control apparatus 100 controls the parent satellite 310 and the child satellite 320. For example, the debris retrieval control apparatus 100 is composed of a ground station, such as a ground antenna device, a communication device connected to a ground antenna device, or an electronic computer, and a ground facility as a server or terminal connected with the ground station via a network. The debris retrieval control apparatus 100 may include a communication device installed in a mobile object such as an airplane, a self-driving vehicle, or a mobile terminal. The debris retrieval control apparatus 100 is an apparatus that controls the parent satellite 310 and the child satellite 320 to retrieve debris such as rocket debris or a failed satellite. The debris retrieval control apparatus 100 is referred to also as a ground device or a ground facility.

The debris retrieval control apparatus 100 includes a computer. The debris retrieval control apparatus 100 includes a processor 910, and also includes other hardware components such as a memory 921, an auxiliary storage device 922, an input interface 930, an output interface 940, and the apparatus communication device 950. The processor 910 is connected with other hardware components via signal lines and controls these other hardware components.

The debris retrieval control apparatus 100 includes a control unit 110 as a functional element. The functions of the control unit 110 are realized by hardware or software.

The processor 910 is a device that executes a debris retrieval program. The debris retrieval program is a program to realize the functions of the control unit 110.

The processor 910 is an integrated circuit (IC) that performs operational processing. Specific examples of the processor 910 are a central processing unit (CPU), a digital signal processor (DSP), and a graphics processing unit (GPU).

The memory 921 is a storage device to temporarily store data. Specific examples of the memory 921 are a static random access memory (SRAM) and a dynamic random access memory (DRAM).

The auxiliary storage device 922 is a storage device to store data. A specific example of the auxiliary storage device 922 is an HDD. Alternatively, the auxiliary storage device 922 may be a portable storage medium, such as an SD (registered trademark) memory card, CF, a NAND flash, a flexible disk, an optical disc, a compact disc, a Blu-ray (registered trademark) disc, or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The input interface 930 is a port to be connected with an input device, such as a mouse, a keyboard, or a touch panel. Specifically, the input interface 930 is a Universal Serial Bus (USB) terminal. The input interface 930 may be a port to be connected with a local area network (LAN).

The output interface 940 is a port to which a cable of an output device, such as a display, is to be connected. Specifically, the output interface 940 is a USB terminal or a High Definition Multimedia Interface (HDMI, registered trademark) terminal. Specifically, the display is a liquid crystal display (LCD).

The apparatus communication device 950 has a receiver and a transmitter. Specifically, the apparatus communication device 950 is a communication chip or a network interface card (NIC). The debris retrieval control apparatus 100 communicates with the debris retrieval satellite 300 or other devices via the apparatus communication device 950.

The debris retrieval program is read into the processor 910 and executed by the processor 910. The memory 921 stores not only the debris retrieval program but also an operating system (OS). The processor 910 executes the debris retrieval program while executing the OS. The debris retrieval program and the OS may be stored in the auxiliary storage device 922. The debris retrieval program and the OS that are stored in the auxiliary storage device 922 are loaded into the memory 921 and executed by the processor 910. Part or the entirety of the debris retrieval program may be embedded in the OS.

The debris retrieval control apparatus 100 may include a plurality of processors as an alternative to the processor 910. These processors share the execution of the debris retrieval program. Each of the processors is, like the processor 910, a device that executes the debris retrieval program.

Data, information, signal values, and variable values that are used, processed, or output by the debris retrieval program are stored in the memory 921 or the auxiliary storage device 922, or stored in a register or a cache memory in the processor 910.

"Unit" of the control unit 110 may be interpreted as "process", "procedure", or "step". "Process" of the control process may be interpreted as "program", "program product", or "computer readable storage medium recording a program".

The debris retrieval program causes a computer to execute each process, each procedure, or each step, where "unit" of the above control unit 110 is interpreted as "process", "procedure", or "step". A debris retrieval method is a method performed by execution of the debris retrieval program by the debris retrieval control apparatus 100.

The debris retrieval program may be stored and provided in a computer readable recording medium or storage medium. Alternatively, the debris retrieval program may be provided as a program product.

Referring to FIG. 2, a configuration of the parent satellite 310 and the child satellite 320 according to this embodiment will be described. Each satellite of the parent satellite 310 and the child satellite 320 will be described as the debris retrieval satellite 300 here.

The debris retrieval satellite 300 is an artificial satellite. The debris retrieval satellite 300 may be an observation satellite or a communications satellite, or may be a satellite produced for the purpose of debris retrieval. The debris retrieval satellite 300 includes devices such as the satellite communication device 131, a command data processing device 132, an attitude and orbit control device 133, a propulsion device 134, a capture device 135, and a mission data processing device 136.

The capture device 135 is a device to capture the debris 200 by sandwiching it between the parent satellite 310 and the child satellite 320. The capture device 135 may transmit capture data indicating a capture state of the debris 200 to the other debris retrieval satellite 300 or the debris retrieval control apparatus 100.

The propulsion device 134 is a device to change the velocity of the debris retrieval satellite 300. Specifically, the propulsion device 134 is a chemical thruster or an electric propulsion thruster. For example, the propulsion device 134 is a hydrazine thruster, an ion engine, or a Hall thruster.

The satellite communication device 131 is a device to receive a command and transmit capture data. The command is a signal transmitted from the ground and transferred, as data or a control signal, to the attitude and orbit control device 133 or the capture device 135 via the command data processing device 132. The capture data is data that indicates a capture operation performed by the capture device 135 and is transmitted, using the satellite communication device 131, to the ground or a data relay satellite via the mission data processing device 136. For example, the capture data indicates a capture state of the debris 200.

The attitude and orbit control device 133 is a device to control attitude elements such as the attitude and angular velocity of the debris retrieval satellite 300 and the orientation of the capture device 135 and to control orbital elements of the debris retrieval satellite 300. The attitude and orbit control device 133 changes the orientation of each attitude element to a desired orientation. Alternatively, the attitude and orbit control device 133 maintains each attitude element in a desired orientation. The attitude and orbit control device 133 includes an attitude sensor, an actuator, and a controller. Specifically, the attitude sensor is a sensor such as a gyroscope, an Earth sensor, a sun sensor, a star tracker, or a magnetic sensor. The actuator is an instrument such as a momentum wheel, a reaction wheel, or a control moment gyroscope. The controller controls the actuator by executing a control program based on measurement data of the attitude sensor or a control command from Earth.

The attitude and orbit control device 133 includes a Global Positioning System receiver (GPSR) and a controller. Specifically, the actuator is an attitude and orbit control thruster. The controller executes a control program based on measurement data of the attitude sensor and the GPSR or a control command from Earth, and performs orbit control by controlling the attitude and the propulsion device 134.

Specifically, the power supply device 137 includes equipment such as a solar cell, a battery, and an electric power control device. The power supply device 137 provides electric power to each piece of equipment installed in the debris retrieval satellite 300.

A processing circuit of the controller included in the attitude and orbit control device 133 will now be described.

The processing circuit may be dedicated hardware, or may be a processor that executes control programs stored in a memory.

In the processing circuit, some functions may be realized by hardware, and the remaining functions may be realized by software or firmware. That is, the processing circuit can be realized by hardware, software, firmware, or a combination of these.

Specifically, the dedicated hardware is a single circuit, a composite circuit, a programmed processor, a parallel-programmed processor, an ASIC, an FPGA, or a combination of these.

ASIC is an abbreviation for Application Specific Integrated Circuit.

FPGA is an abbreviation for Field Programmable Gate Array.

Figure 3:
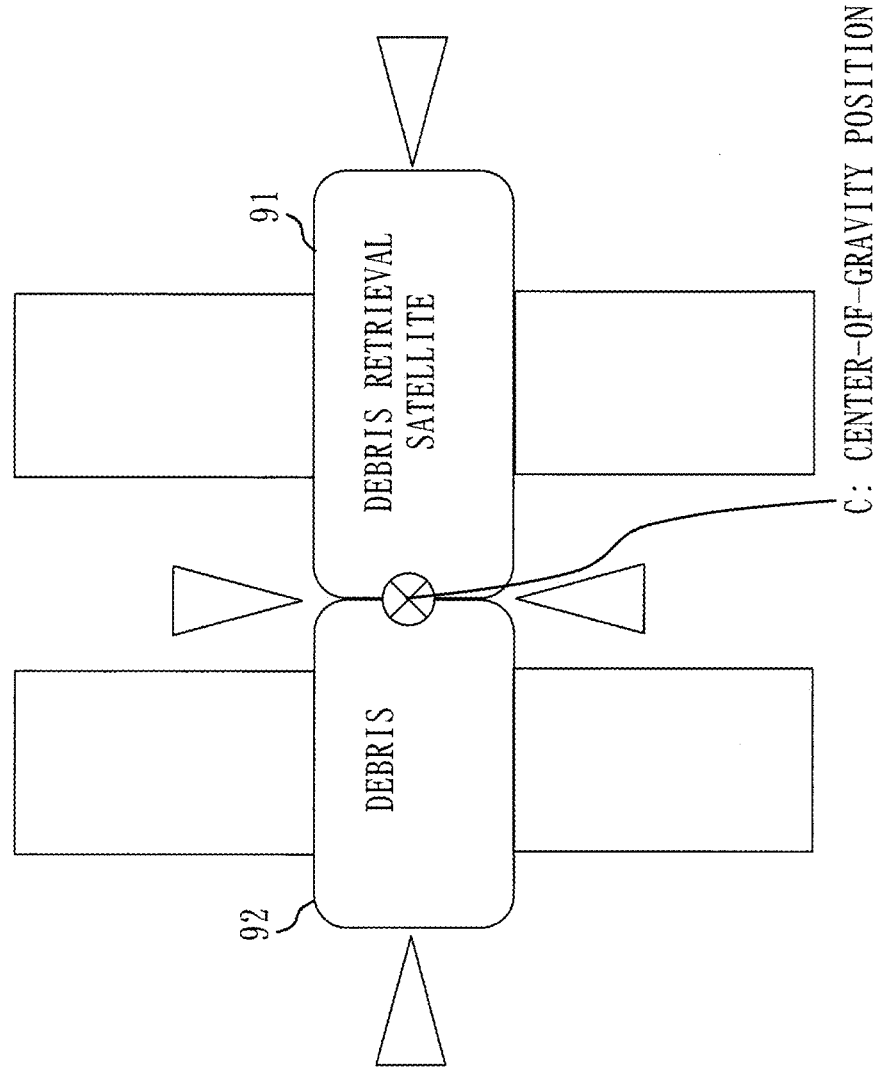
FIG. 3 is a comparison example to be compared with Embodiment 1.

FIG. 3 is a diagram illustrating a comparison example to be compared with this embodiment.

As illustrated in FIG. 3, a debris retrieval satellite 91 of the comparison example retrieves debris 92 such as an artificial satellite that has lost an orbit control function due to a failure or rocket debris. In FIG. 3, the debris retrieval satellite 91 of the comparison example captures the debris 92 with a capture device, and carries out an active deorbit operation in a state in which the debris retrieval satellite 91 and the debris 92 are connected. In this case, propulsion devices in a plurality of directions need to be placed so as to sandwich a center-of-gravity position C of the debris retrieval satellite 91 and the debris 92 being connected together. However, it is difficult with only the debris retrieval satellite 91 to place the propulsion devices in the above arrangement.

Description of Operation

Figure 4:
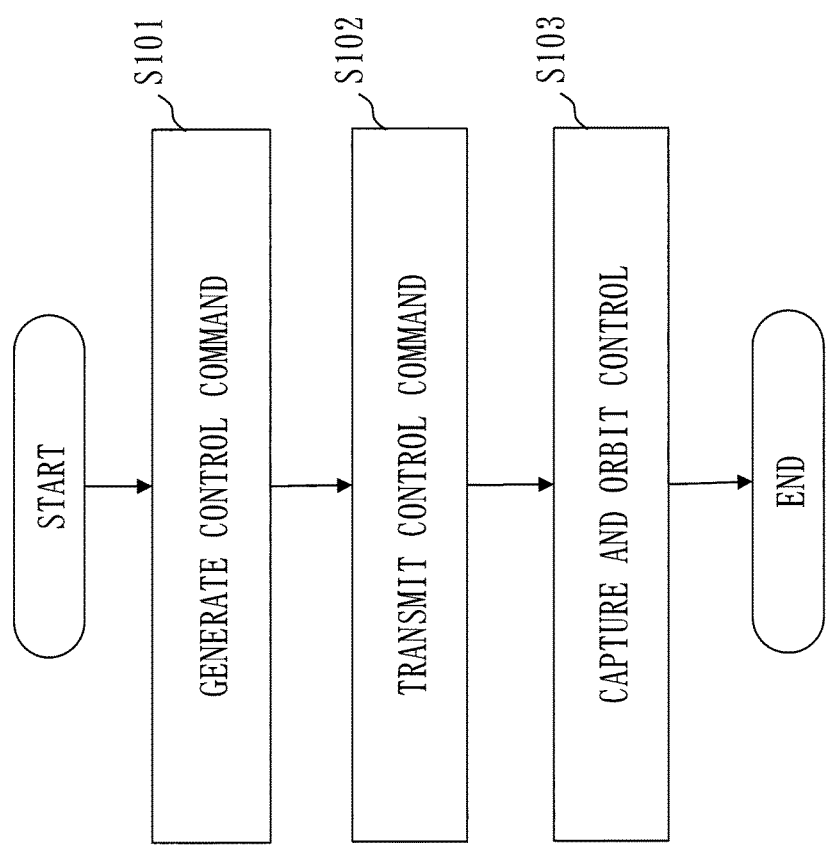
FIG. 4 is a flowchart illustrating operation of the debris retrieval system according to Embodiment 1.

Referring to FIG. 4, operation of the debris retrieval system 500 according to this embodiment will be described.

A procedure for the operation of the debris retrieval system 500 is equivalent to the debris retrieval method. A program that realizes the operation of the debris retrieval system 500 is equivalent to the debris retrieval program.

In step S101, the control unit 110 of the debris retrieval control apparatus 100 generates a control command 51 to be transmitted to at least one of the parent satellite 310 and the child satellite 320. The control command 51 includes a capture command 511 and an orbit control command 512.

The control unit 110 generates the capture command 511 to capture the debris 200 by sandwiching it between the parent satellite 310 and the child satellite 320.

Figure 5:
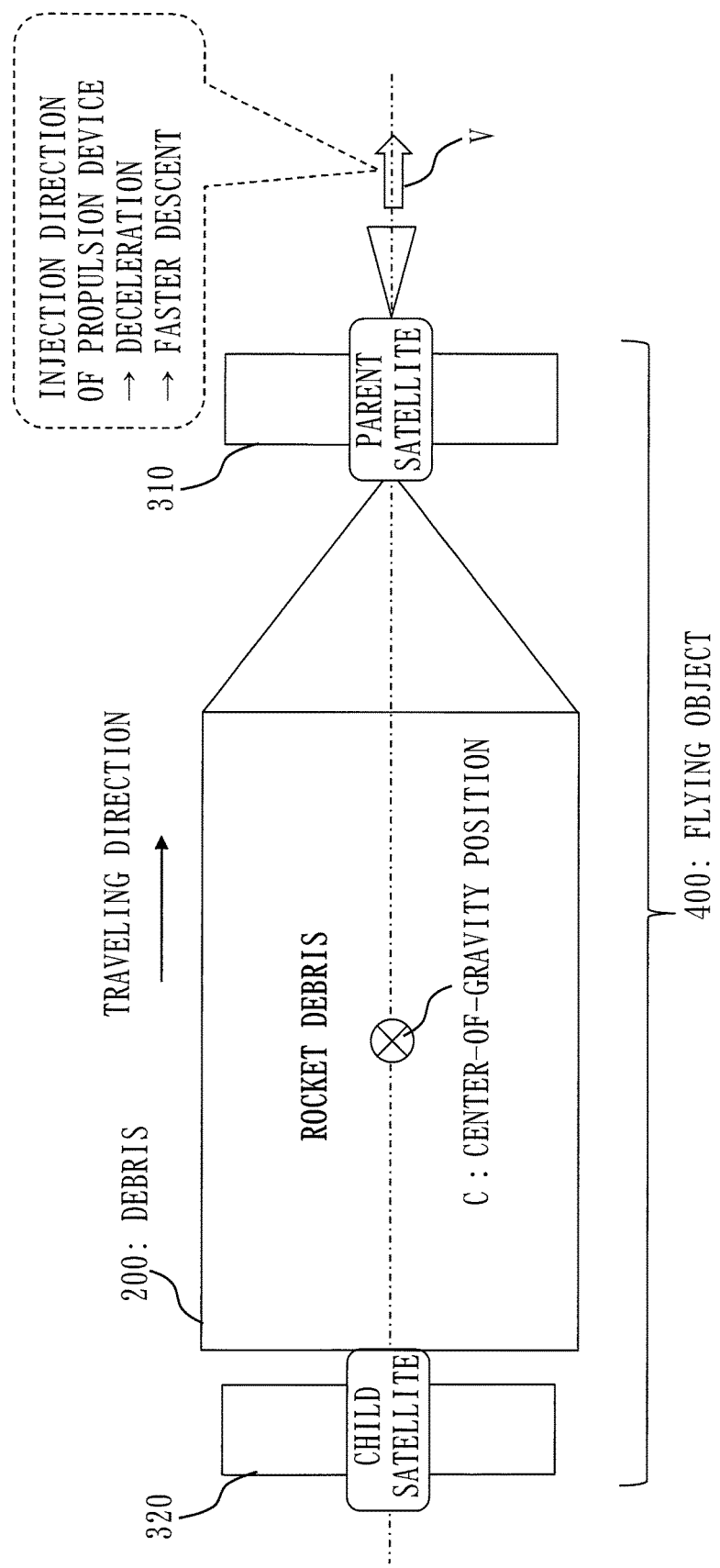
FIG. 5 is a diagram illustrating an example of capture of debris and orbit control by debris retrieval satellites according to Embodiment 1.

FIG. 5 is a diagram illustrating an example of capture of the debris 200 and orbit control by the debris retrieval satellites 300 according to this embodiment. As illustrated in FIG. 5, an object which is the parent satellite 310, the debris 200, and the child satellite 320 being connected together will be referred to as a flying object 400. The control unit 110 generates the capture command 511 to place the parent satellite 310 and the child satellite 320 so that a center-of-gravity position C of the flying object 400 is on a straight line of a traveling direction vector V of the propulsion device.

The control unit 110 generates the orbit control command 512 to carry out an active deorbit operation on the flying object 400 which is the parent satellite 310, the debris 200, and the child satellite 320 being connected together.

In step S102, the control unit 110 transmits the control command 51 including the capture command 511 and the orbit control command 512 to at least one of the parent satellite 310 and the child satellite 320 via the apparatus communication device 950.

The control command 51 may be received by the parent satellite 310 as a single recipient. Alternatively, the debris retrieval control apparatus 100 may generate a control command 51 individually for each of the parent satellite 310 and the child satellite 320 and transmit the control command 51 to each.

Mutual communication between the parent satellite 310 and the child satellite 320 may be performed by non-directional short-range communication. The parent satellite 310 and the child satellite 320 may be connected at the time of launch and launched simultaneously. Alternatively, the parent satellite 310 and the child satellite 320 may approach the debris 200 after being connected with each other.

In step S103, the debris retrieval satellites 300 capture the debris 200 based on the control command 51 by sandwiching it between the parent satellite 310 and the child satellite 320, and carry out the active deorbit operation on the flying object 400. Specifically, the capture devices 135 of the parent satellite 310 and the child satellite 320 capture the debris 200 by sandwiching it based on the control command 51. Then, the propulsion devices 134 of the parent satellite 310 and the child satellite 320 carry out the active deorbit operation on the flying object 400 based on the control command 51.

As illustrated in FIG. 5, each of the parent satellite 310 and the child satellite 320 is placed so that the center-of-gravity position C of the flying object 400 is on a straight line of the traveling direction vector V of the propulsion device.

For example, when rocket debris is to be retrieved, the debris retrieval satellites 300 capture the upper end in an axial direction with the parent satellite 310 and capture the lower end with the child satellite 320. Then, orbit control and attitude control are performed as the integrated flying object 400.

When it is assumed that the upper end of the debris 200 faces toward the traveling direction, an injection in a direction opposite to the traveling direction by the propulsion device of the parent satellite 310 causes the flying object 400 to decelerate and descend in altitude. By continuing to descend in altitude, the flying object 400 will eventually descend to the atmosphere due to the gravity of Earth and burn up as a result of friction with the atmosphere, thereby completing the purpose of debris removal.

Figure 6:
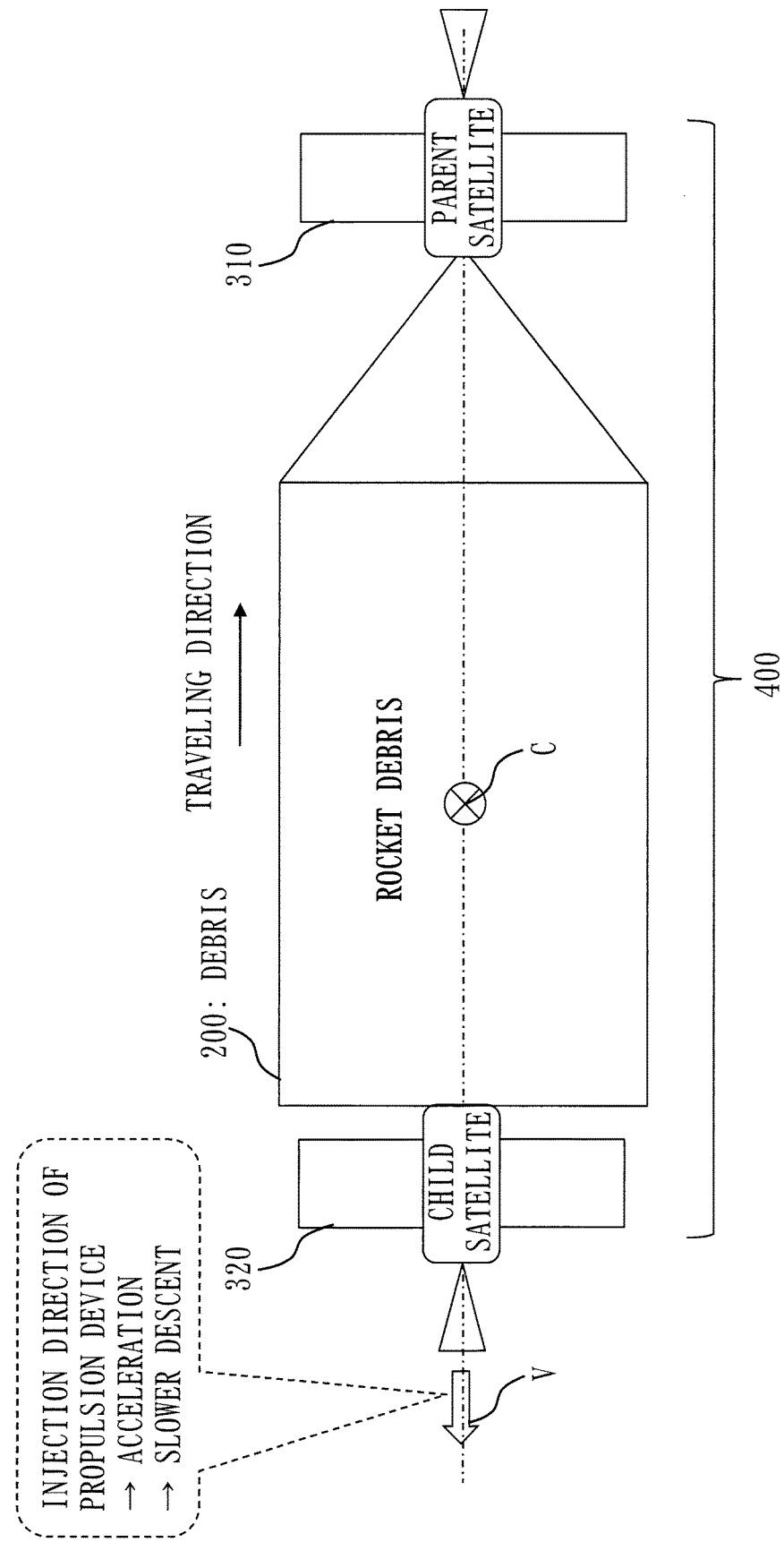
FIG. 6 is a diagram illustrating an example of capture of debris and orbit control by debris retrieval satellites according to Embodiment 1.

FIG. 6 is a diagram illustrating an example of capture of the debris 200 and orbit control by the debris retrieval satellites 300 according to this embodiment.

If there is a risk of intrusion into a congested orbit during a descent in altitude, an injection in the traveling direction by the child satellite 320 generates an acceleration effect, so that the falling velocity of the flying object 400 is reduced.

As illustrated in FIGS. 5 and 6, in the debris retrieval system 500, the velocity of the flying object 400 can be increased or decreased by appropriately controlling the operation amount and timing of the propulsion devices 134 of the parent satellite 310 and the child satellite 320. Specifically, the debris retrieval system 500 can speed up the descent before the flying object 400 intrudes into the congested orbit so as to cause it to fall before intruding into the congested orbit. Alternatively, the debris retrieval system 500 may slow down the descent, and then speed up the descent for falling after the congested orbital plane has rotated and passed away to an orbital plane different from that of the flying object 400. In this way, the debris retrieval system 500 carries out the active deorbit operation on the flying object 400.

Other Configurations

<Variation 1>

Figure 7:
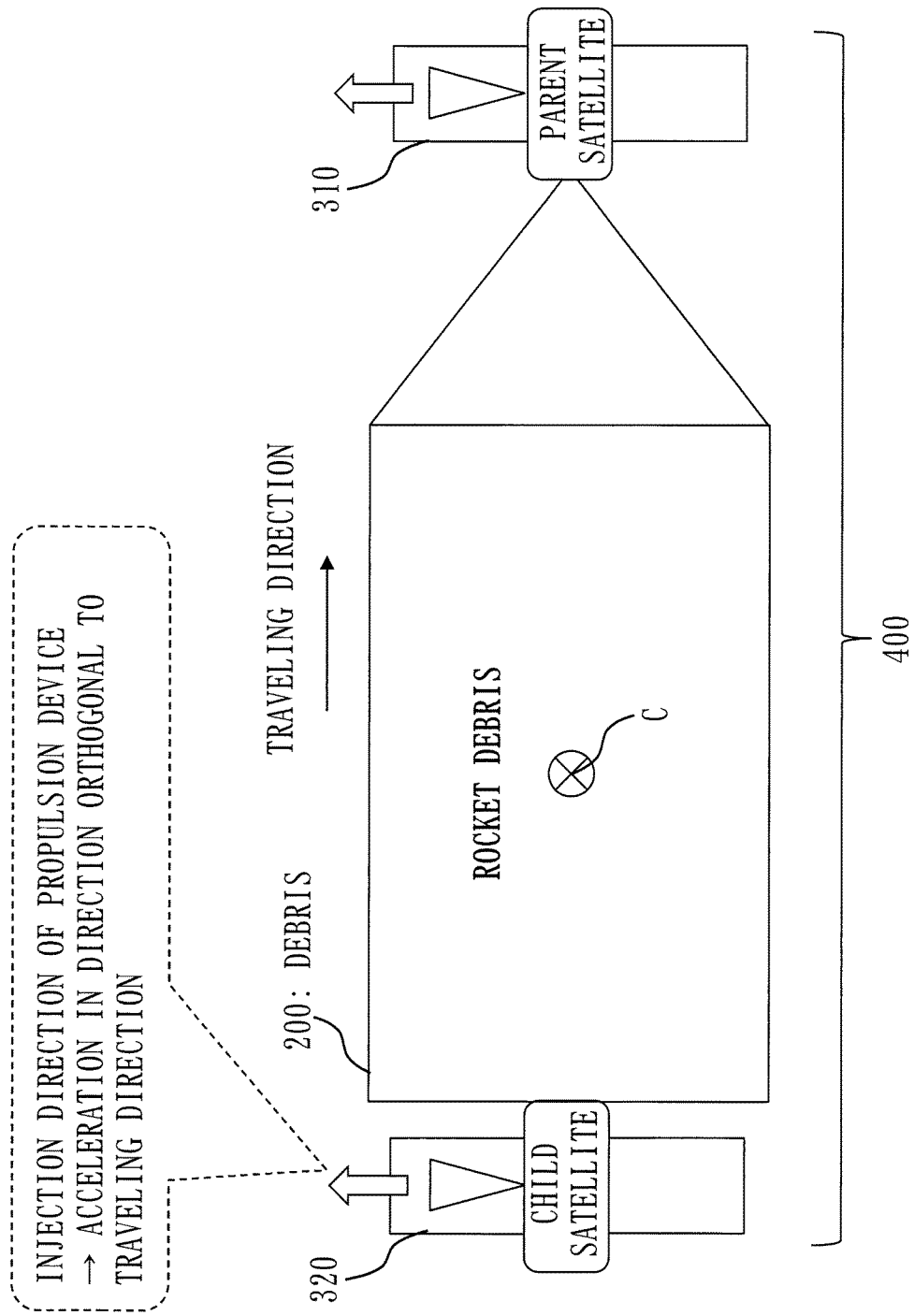
FIG. 7 is a diagram illustrating an example of capture of debris and orbit control by debris retrieval satellites according to a variation of Embodiment 1.
Figure 8:
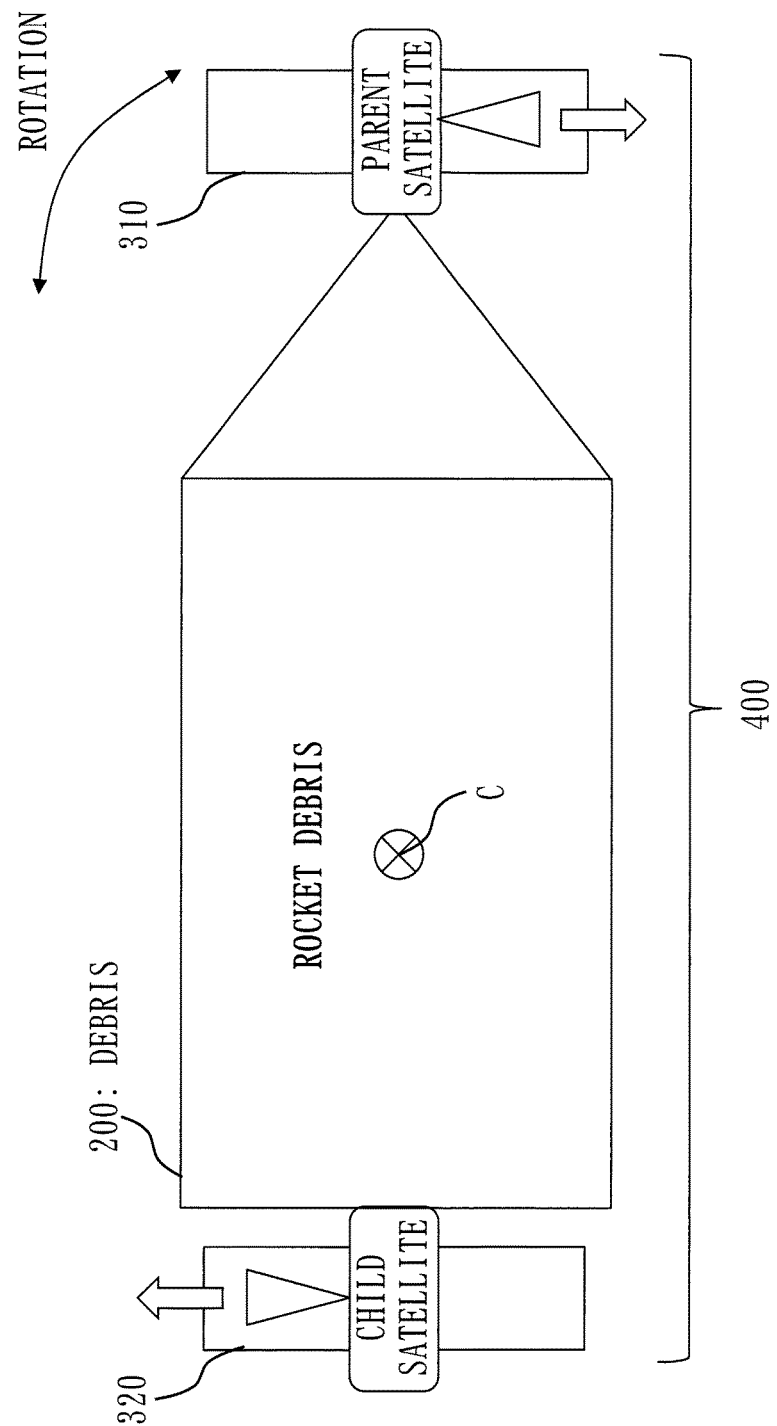
FIG. 8 is a diagram illustrating an example of capture of debris and orbit control by debris retrieval satellites according to a variation of Embodiment 1.

FIGS. 7 and 8 are diagrams illustrating examples of capture of the debris 200 and orbit control by the debris retrieval satellites 300 according to a variation of this embodiment.

Orbit control and attitude control of the flying object 400 requires not only increasing or decreasing the velocity in the traveling direction but also a movement of the propulsion device 134 in a direction orthogonal to the traveling direction, that is, a traveling-direction orthogonal direction, or a movement in a rotation direction.

As illustrated in FIG. 7, the flying object 400 can accelerate in the traveling-direction orthogonal direction. Specifically, each of the parent satellite 310 and the child satellite 320 operates the propulsion device 134 in the traveling-direction orthogonal direction and in the same direction and with thrust that is inversely proportional to the ratio of the distance from the center of gravity of the flying object 400 to each of the propulsion devices 134.

As illustrated in FIG. 8, a movement in the rotation direction can be made by causing the propulsion device 134 of each of the parent satellite 310 and the child satellite 320 to make an injection in a direction opposite to each other or to operate with thrust that generates a moment corresponding to the distance from the center of gravity of the flying object 400.

<Variation 2>

In this embodiment, the functions of the control unit 110 are realized by software. As a variation, the functions of the control unit 110 may be realized by hardware.

Figure 9:
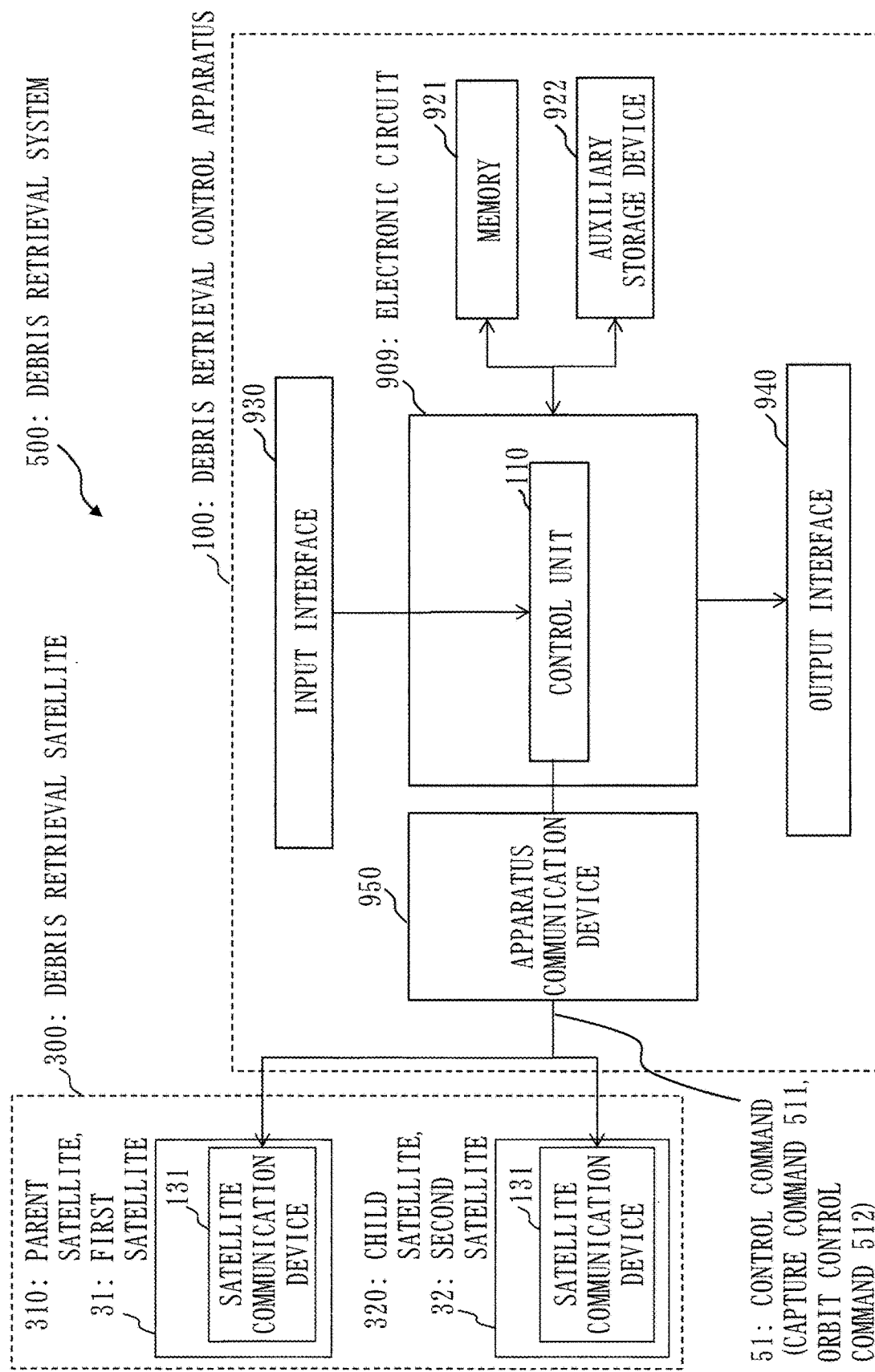
FIG. 9 is a configuration diagram of the debris retrieval system according to a variation of Embodiment 1.

FIG. 9 is a diagram illustrating a configuration of the debris retrieval system 500 according to a variation of this embodiment.

The debris retrieval control apparatus 100 includes an electronic circuit 909 in place of the processor 910.

The electronic circuit 909 is a dedicated electronic circuit that realizes the functions of the control unit 110.

Specifically, the electronic circuit 909 is a single circuit, a composite circuit, a programmed processor, a parallel-programmed processor, a logic IC, a GA, an ASIC or an FPGA. GA is an abbreviation for Gate Array.

The functions of the control unit 110 may be realized by one electronic circuit, or may be distributed among and realized by a plurality of electronic circuits.

As another variation, some of the functions of the control unit 110 may be realized by the electronic circuit, and the rest of the functions may be realized by software.

Each of the processor and the electronic circuit is referred to also as processing circuitry. That is, in the debris retrieval control apparatus 100, the functions of the control unit 110 are realized by the processing circuitry.

Description of Effects of this Embodiment

For debris such as rocket debris or a large satellite that has failed, the center-of-gravity position of a flying object which is a debris retrieval satellite being connected with the captured debris is located far, making it difficult to place propulsion devices. In the debris retrieval system according to this embodiment, even for debris for which it is difficult to place propulsion devices because the center-of-gravity position of a flying object which is a debris retrieval satellite being connected with the captured debris is far, an active deorbit operation can be easily carried out and the debris can be retrieved unerringly.

In the debris retrieval system according to this embodiment, the center-of-gravity position as the flying object after the parent satellite and the child satellite have captured debris is positioned to be on the straight line of the traveling direction vector of the propulsion devices of the parent satellite and the child satellite. Therefore, the debris retrieval system according to this embodiment can accurately perform orbit control and attitude control of the flying object.

The debris retrieval system according to this embodiment can realize the active deorbit operation whose capability has not been explicitly defined in PMD or ADR for performing a deorbit action. That is, the capability for operation control in the deorbit process is provided, and the active deorbit operation can be realized by capturing a non-cooperative target without a dedicated attachment and restraining the six degrees of freedom of the target, and arranging an injection environment for the propulsion devices necessary for performing orbit control and attitude control.

Embodiment 2

In this embodiment, additions to Embodiment 1 will be mainly described. Components that are substantially the same as those in Embodiment 1 are denoted by the same reference signs, and description thereof will be omitted.

Figure 10:
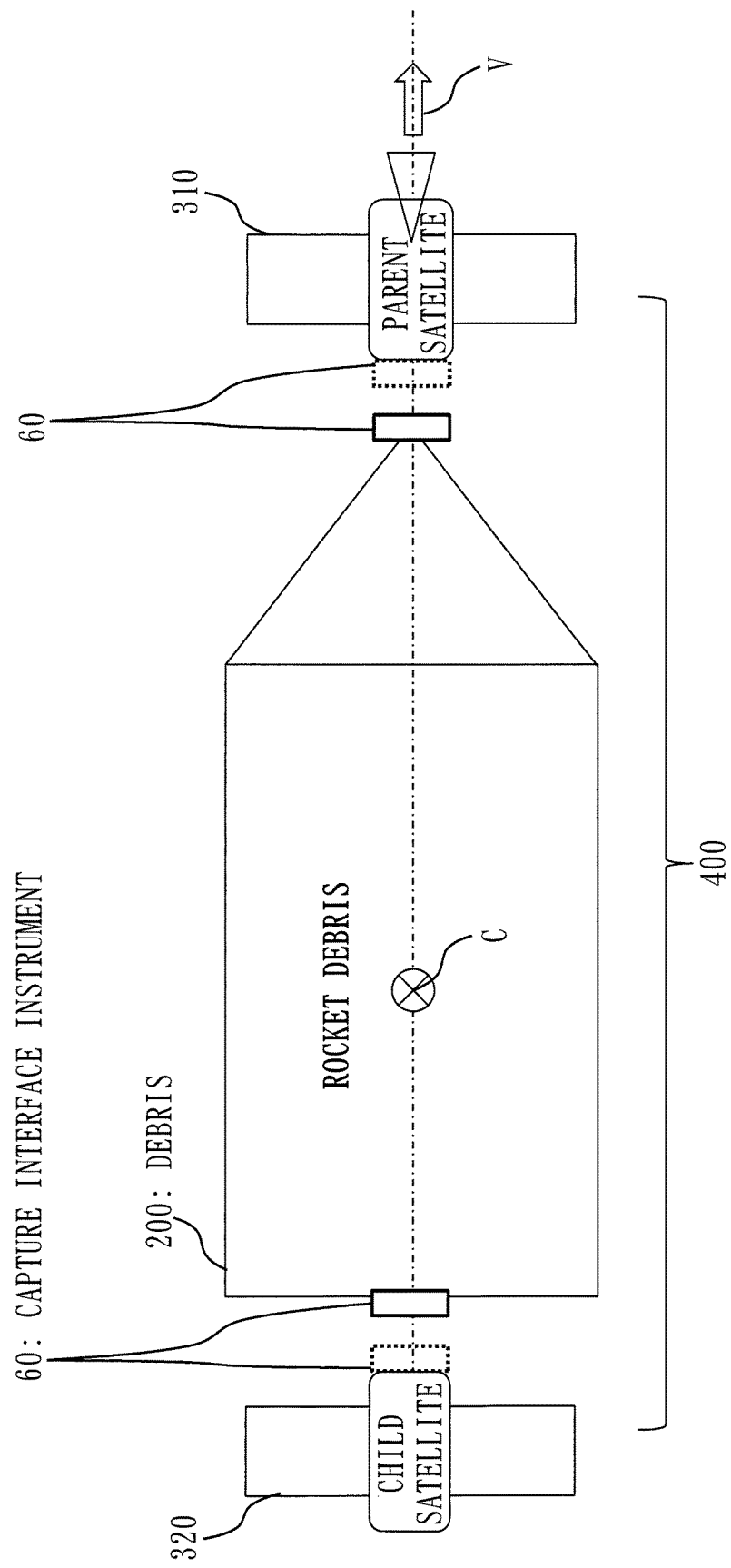
FIG. 10 is a diagram illustrating an example of capture of debris by debris retrieval satellites according to Embodiment 2.

FIG. 10 is a diagram illustrating an example of capture of the debris 200 by the debris retrieval satellites 300 according to this embodiment.

In this embodiment, a capture interface instrument 60 is provided in each of the debris retrieval satellites 300 and the debris 200.

The capture interface instrument 60 is placed so that the center-of-gravity position C of the flying object 400 is on the straight line of the traveling direction vector V of the propulsion device 134.

Each of the parent satellite 310 and the child satellite 320 is provided with the capture interface instrument 60 for capturing the debris 200. The debris 200 is also provided with a capture interface instrument 60 at a position such that the center-of-gravity position C of the flying object 400 is on the straight line of the traveling direction vector V of the propulsion device 134 when connected with the parent satellite 310 and the child satellite 320. The capture interface instrument 60 is preferably provided in advance in each of the parent satellite 310 and the child satellite 320 and in objects that may become debris 200 in the future. Specifically, the capture interface instrument 60 is preferably provided in advance in each satellite of the parent satellite 310 and the child satellite 320, rockets for launching, observation satellites, and communications satellites.

The debris retrieval system according to this embodiment facilitates retrieval of debris such as an artificial satellite or rocket that has completed a mission and a failed artificial satellite.

Embodiment 3

In this embodiment, additions to Embodiments 1 and 2 will be mainly described. Components that are substantially the same as those in Embodiments 1 and 2 are denoted by the same reference signs, and description thereof will be omitted.

Figure 11:
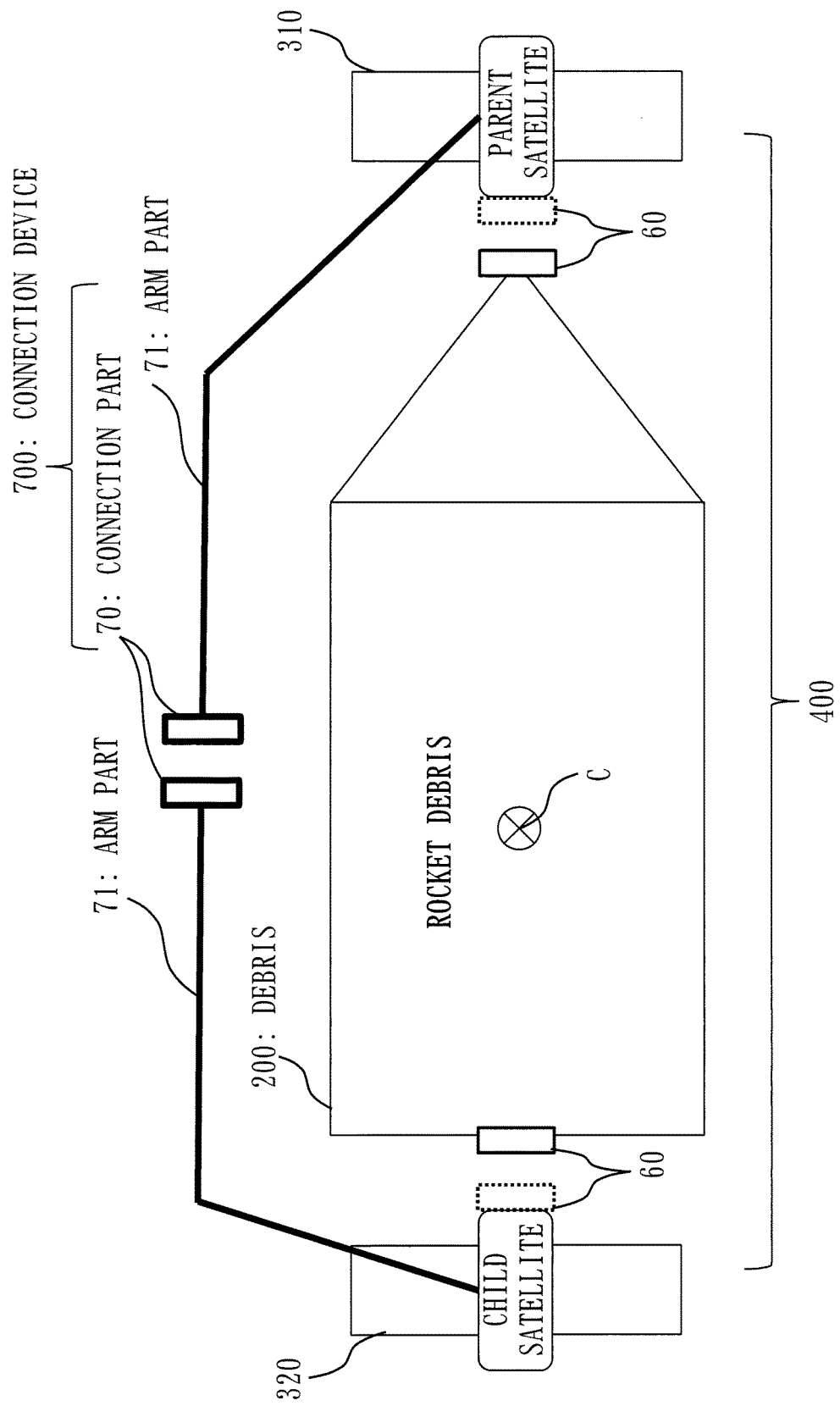
FIG. 11 is a diagram illustrating an example of capture of debris by debris retrieval satellites according to Embodiment 3.

FIG. 11 is a diagram illustrating an example of capture of the debris 200 by the debris retrieval satellites 300 according to this embodiment.

In this embodiment, the debris retrieval satellite 300 includes a connection device 700.

The connection device 700 is included in each of the parent satellite 310 and the child satellite 320. The connection device 700 includes an arm part 71 and a connection part 70.

The arm part 71 extends from a body portion of each the parent satellite 310 and the child satellite 320 toward the other satellite with which the debris 200 is sandwiched. That is, the arm part 71 extending from the parent satellite 310 extends toward the child satellite 320, which is the other satellite. The arm part 71 extending from the child satellite 320 extends toward the parent satellite 310, which is the other satellite.

The connection part 70 is provided at an end portion of the arm part 71 and connects with an end portion of the arm part 71 of the other satellite. Specifically, the connection part 70 is a holding mechanism or a magnet. That is, the connection part 70 of the parent satellite 310 connects with the connection part 70 provided at the end portion of the arm part 71 of the child satellite 320. The connection part 70 of the child satellite 320 connects with the connection part 70 provided at the end portion of the arm part 71 of the parent satellite 310. That is, the connection devices 700 mechanically connect the parent satellite 310 and the child satellite 320 that are flying with the debris 200 being sandwiched between them.

The arm part 71 may be provided, for example, in the parent satellite 310 so as to wrap around the debris 200 and reach the child satellite 320. In this case, the child satellite 320 may include only the connection part 70. Alternatively, the configurations of the parent satellite 310 and the child satellite 320 may be interchanged.

Figure 12:
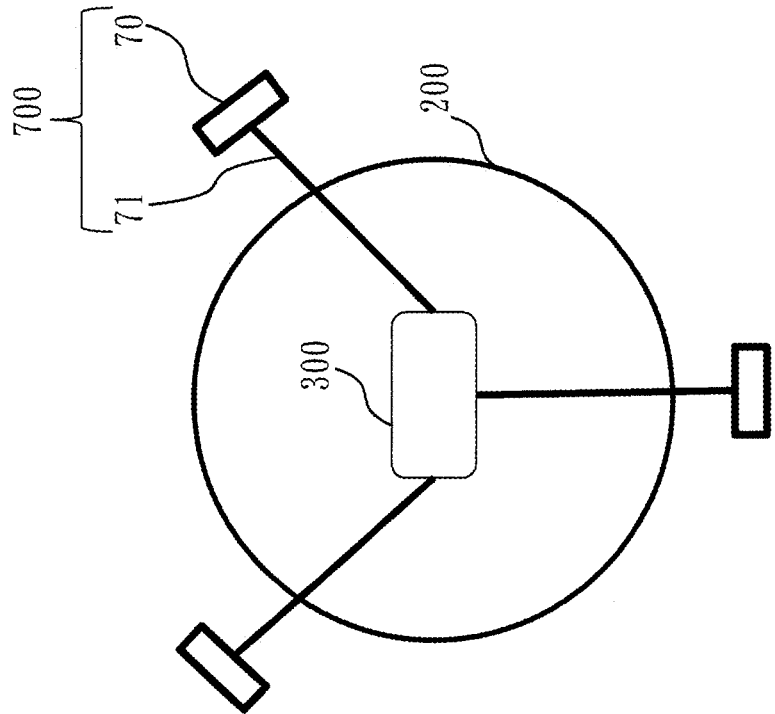
FIG. 12 is a diagram illustrating an example of a connection device according to Embodiment 3.

FIG. 12 is a diagram illustrating an example of the connection device 700 according to this embodiment.

As illustrated in FIG. 12, three or more connection devices 700 may be provided. In FIG. 12, three connection devices 700 are illustrated. Three or more connection devices 700 can be placed to surround a large structure such as a rocket.

The arm part 71 may be provided only in the parent satellite 310 or may be provided in each of the parent satellite 310 and the child satellite 320. The connection device 700 may be utilized as a capture device for a large structure such as a rocket by contracting the connection device 700 or pulling the child satellite 320 from the parent satellite 310 as a robot arm after enclosing the large structure.

The debris retrieval system according to this embodiment facilitates capture of debris that is not provided with a structure such as a protrusion suitable for capture. It is also possible to avoid a risk of pushing away and losing debris as a result of failing to capture the debris in orbit.

In Embodiments 1 to 3 above, each unit of the debris retrieval control apparatus has been described as an independent functional block. However, the configuration of the debris retrieval control apparatus may be different from the configuration in the embodiments described above. The functional blocks of the debris retrieval control apparatus may be arranged in any configuration, provided that the functions described in the above embodiments can be realized. The debris retrieval control apparatus may be one device or may be a system composed of a plurality of devices.

A plurality of portions of Embodiments 1 to 3 may be implemented in combination. Alternatively, one portion of these embodiments may be implemented. These embodiments may be implemented as a whole or partially in any combination.

That is, in Embodiments 1 to 3, each of the embodiments may be freely combined, or any constituent element of each of the embodiments may be modified, or any constituent element may be omitted in each of the embodiments.

The above embodiments are essentially preferable examples, and are not intended to limit the scope of the present invention, the scope of applications of the present invention, and the scope of uses of the present invention. Various modifications can be made to the above embodiments as necessary.

REFERENCE SIGNS LIST

31: first satellite; 32: second satellite; 51: control command; 60: capture interface instrument; 70: connection part; 71: arm part; 100: debris retrieval control apparatus; 110: control unit; 131: satellite communication device; 132: command data processing device; 133: attitude and orbit control device; 134: propulsion device; 135: capture device; 136: mission data processing device; 137: power supply device; 92, 200: debris; 91, 300: debris retrieval satellite; 310: parent satellite; 320: child satellite; 400: flying object; 500: debris retrieval system; 511: capture command; 512: orbit control command; 700: connection device; 909: electronic circuit; 910: processor; 921: memory; 922: auxiliary storage device; 930: input interface; 940: output interface; 950: apparatus communication device.

The invention claimed is:

1. A debris retrieval control apparatus to control retrieval of debris, the debris retrieval control apparatus comprising:
   an apparatus communication device to communicate with at least one of a first satellite and a second satellite; and
   processing circuitry configured to generate a control command to capture the debris by sandwiching the debris between the first satellite and the second satellite and carry out an active control operation during orbital descent on a flying object formed by the first satellite, the debris, and the second satellite, wherein a central body of the first satellite, the debris, and a central body of the second satellite are connected together by physical contact, between the debris and the respective central bodies of the first satellite and second satellite, and transmit the control command to at least one of the first satellite and the second satellite via the apparatus communication device,
   wherein the control command includes instructions to operate a propulsion device included in each of the first satellite and the second satellite, and
   wherein the processing circuitry transmits the control command to place the first satellite and the second satellite so that a center-of-gravity position of the flying object is on a straight line of a traveling direction vector of the propulsion device.

2. The debris retrieval control apparatus according to claim 1,
   wherein the debris is an artificial satellite or rocket debris.

3. A debris retrieval satellite that includes a first satellite and a second satellite and retrieves debris, the debris retrieval satellite comprising:

a capture device to capture the debris by sandwiching the debris between the first satellite and the second satellite; and an attitude and orbit control device configured to carry out an active control operation during orbital descent on a flying object formed by the first satellite, the debris, and the second satellite, wherein a central body of the first satellite, the debris, and a central body of the second satellite are connected together by physical contact, between the debris and the respective central bodies of the first satellite and second satellite, wherein the first satellite and the second satellite each include a propulsion device, and the first satellite and, the second satellite are placed so that a center-of-gravity position of the flying object is on a straight line of a traveling direction vector of the propulsion device.

4. The debris retrieval satellite according to claim 3, wherein the debris is an artificial satellite or rocket debris.

5. A debris retrieval satellite, comprising:

a capture interface instrument to be provided in each of a debris retrieval satellite to retrieve debris, the debris retrieval satellite including a first satellite, a second satellite, and processing circuity configured to generate a control command to capture the debris by sandwiching the debris between the first satellite and the second satellite, and transmit the control command to at least one of the first satellite and the second satellite, the first satellite and the second satellite each including a propulsion device, wherein the capture interface instrument is placed such that a center-of-gravity position of a flying object, which is the first satellite, the debris, and the second satellite, wherein a central body of the first satellite, the debris, and a central body of the second satellite are connected together by physical contact, between the debris and the respective central bodies of the first satellite and second satellite, is on a straight line of a traveling direction vector of the propulsion device.

6. A debris retrieval satellite, comprising:

a connection device to retrieve debris, the debris retrieval satellite including a first satellite, a second satellite, and processing circuitry configured to generate a control command to capture the debris by sandwiching the debris between the first satellite and the second satellite, and transmit the control command to at least one of the first satellite and the second satellite, wherein a central body of the first satellite, the debris, and a central body of the second satellite are connected together by physical contact, between the debris and the respective central bodies of the first satellite and second satellite, wherein a center-of-gravity position of the flying object is on a straight line of a traveling direction vector of a propulsion device of the debris retrieval satellite, wherein the connection device is included with each of the first satellite and the second satellite between which the debris is sandwiched, and comprises an aim part that extends toward the other satellite with which the debris is sandwiched and a connection part that is provided at an end portion of the arm part and connects with an end portion of an arm part of the other satellite.

7. A debris retrieval system that includes a first satellite, a second satellite, and a debris retrieval control apparatus to communicate with at least one of the first satellite and the second satellite, the debris retrieval system comprising:

processing circuitry configured to generate a control command to capture debris by sandwiching, the debris between the first satellite and the second satellite and carry out an active control operation during orbital descent on a flying object which is the first satellite, the debris, and the second satellite, wherein a central body of the first satellite, the debris, and a central body of the second satellite are connected together by physical contact, between the debris and the respective central bodies of the first satellite and second satellite, and transmit the control command to at least one of the first satellite and the second satellite, wherein each of the first satellite and the second satellite includes a capture device to capture the debris based on the control command and a propulsion device to carry out the active control operation during orbital descent on the flying object based on the control command, and wherein the processing circuitry transmits the control command to place the first satellite and the second satellite so that a center-of-gravity position of the flying object is on a straight line of a traveling direction vector of the propulsion device.

* * * * *